3,507,822
TOOTH COATING COMPOSITION
Torao Miyami, 707 Okudo-honcho, Katsushika-ku,
Tokyo, Japan
No Drawing. Filed Aug. 18, 1967, Ser. No. 661,529
Int. Cl. C08f *15/16, 15/26, 45/38*
U.S. Cl. 260—31.8                                    9 Claims

ABSTRACT OF THE DISCLOSURE

The invention relates to a coating composition which is a mixture of a vinyl resin composition and a cyanoacrylate represented by the general formula

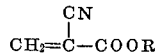

wherein R represents a hydrogen atom, or saturated straight or branched aliphatic hydrocarbon radicals having 1–8 carbon atoms.

---

This invention relates to a vinyl resin coating composition, and more especially to a coating composition which has a very good adhesion to a wet body and which has friction-resistance.

Recently a vinyl resin coating composition has been developed for application to various materials such as wood, plastics, rubber, leather, glass and metal; however it is in general lacking in adequate adhesion to wet materials so that its use is limited, to an extent, to the kind of material on which it is to be applied and the coating procedure.

Accordingly, if the adhesion of vinyl resin coating composition to wet materials could be improved, the usefulness of said vinyl resin coating composition would be increased greatly and the coating procedure could be carried out very advantageously.

In this connection, the present invention has accomplished these results; it has now been found possible to increase greatly the adhesion and friction-resistance of vinyl resin coating compositions. It has now been found that the adhesion to wet materials and the resistance of the coat film to mechanical abrasion and impact can be greatly increased by adding to a vinyl resin coating composition a cyanoacrylate monomer represented by the general formula

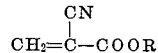

wherein R represents hydrogen atom, or saturated straight or branched aliphatic hydrocarbon radical having 1–8 carbon atoms.

As typical cyanoacrylates and their derivatives as mentioned above which are useful in the present invention, there may be mentioned cyanoacrylic acid, and cyanoacrylic acid esters, and the like; more especially the lower alkyl esters of cyanoacrylic acid such as methyl ethyl or propyl cyanoacrylate is preferable. The amount of said cyanoacrylate monomer added is 0.01–2% by weight based on the total weight of the composition, and preferably 0.2–1% by weight. The cyanoacrylate added to the coating composition is polymerized during its storage over a long period to render the solution turbid resulting in the lowering of adhesion. To avoid such phenomenon, it has been found effective to add, based on the weight of the monomer, 5–50% by weight of an inorganic acid such as phosphoric acid; Lewis acid such as zinc chloride, iron sulfate etc.; organic carboxylic acid such as formic, acetic, propionic, tartaric, succinic, malic, palmitic, stearic, eleic and tannic acid etc.; organic sulfonic acid such as benzene- or p-toluene sulfonic acid etc.; aldehyde such as formaldehyde, acetaldehyde, paraformaldehyde etc.; and ketones.

The cyanoacrylate is polymerized and cured rapidly by the presence of —OH to form a strong polymer, although the theory through which the addition of said cyanoacrylate improves greatly the adhesion has not yet been completely determined. It is believed, therefore, that the polymerization of cyanoacrylate is begun by the moisture present on the surface coated by the coating composition containing said cyanoacrylate when it is applied to a body having the moisture thereon. While it is preferable that the surface to be coated is wet, the coating composition can also be applied to a dry body because the cyanoacrylate is polymerized by the moisture present in air.

Since the polymerization of said cyanoacrylate caused by —OH is carried out rapidly even at ordinary temperature, it is cured almost immediately after coating without the need of additional treatment, such as heat drying, to form a strong film.

In comparison with a conventional vinyl resin coating composition, the coating composition according to this invention has very great adhesion as well as great resistance to mechanical abrasion or impact resistance. That is to say, while the coat film of a conventional vinyl resin coating composition peels when subjected to a wide range by scratches or impacts, only the area subjected to a scratch or impact is stripped in the film of the composition according to this invention, thus resulting in minimum damage.

It is believed that such characteristic may result from the advantageous combination of the flexibility of vinyl resin with the hardness and great adhesion of cyanoacrylate polymer.

The coating composition according to this invention has very excellent properties as mentioned above and is suitable for coating not only conventional materials but also special materials, such as those which are dried difficultly, such as, for example, skin, organs or teeth of the human body. Namely, it serves as a bandage material to the skin of the human body and it can be used as styptic and suture material in cutting blood vessels, gullet or trachea in a surgical operation when it is used for organs of the human body. Further, when it is used for coating teeth, it is valuable for the prevention of the deposition of tartar and the pyorrhea and decayed tooth and as a cosmetic to improve the beauty thereof.

The vinyl resin coating composition according to this invention is one in which a film-forming component consisting mainly of vinyl resin is incorporated with a plasticizer and solvent, and if necessary, with a filler, coloring matter, pigment and other auxiliary materials. As the vinyl resin to be used in this invention, there may be mentioned homopolymers or copolymers and the like of vinyl chloride, vinyl acetate, vinyl toluene, vinyl naphthalene, ethyl hexyl vinyl ether, isopropyl vinyl ether, vinyl methyl ether, vinyl ethyl ether, styrene, methyl styrene, vinylidene, ethylene, propylene, acrylonitrile, acrylic acid, methacrylic acid, itaconic acid, maleic acid, fumaric acid and phthalic acid and the lower alkyl esters of these acids, or the substituted homologues and isomers thereof, or the vinyl ester of alkanoic acid. The copolymer of vinyl chloride-vinyl acetate is most suitable.

A vinyl chloride-vinyl acetate copolymer which may be used in this invention is produced by solution polymerization and has most preferably a polymerization degree ($\bar{P}$) of 100–500, and preferably 300–400, a solution viscosity (centipoise at 25° C.) of 1,000–7,000, and preferably 2,000–5,000, and the composition has a resin content of 10–50%, and preferably 20–40%.

As the film-forming component other than said vinyl resin, there may be added to the composition cellulose derivatives such as nitrocellulose, cellulose acetate butyrate, cellulose acetate propionate and the like; other resins such as phenol resin, modified phenol resin, coumarone resin, modified coumarone resin, rosin ester resin and the like; and rubbery materials such as butadiene-acrylonitrile copolymer, polyisoprene, polychloroprene, polybutadiene and the like, whereby the characteristic of the film formed can be modified desirably.

As the plasticizer to be used in the composition according to this invention, those of phthalic acid series are most preferable. For example, there are mentioned dibutyl phthalate, benzyl butyl phthalate, butyl cyclohexyl phthalate, 2-ethylhexyl benzyl phthalate, dicyclohexyl phthalate and the like. Almost all commercial plasticizers such as DBP, DOP, TCP or TOF can be used. These plasticizers are contained generally in an amount of about 1–50% by weight, more preferably 5–20% by weight based on the total amount of nonvolatile components.

As the solvent to be used in the composition according to this invention, there may be used almost all conventional organic solvents such as methyl acetate, ethyl acetate, butyl acetate, amyl acetate, isoamyl acetate, acetone, methyl ethyl ketone, methyl isobutyl ketone, benzene, toluene, xylene, Cellosolve and the like. However, the moisture in the solvent should be removed as much as possible, since the cyanoacrylate would be polymerized during storage, thus resulting in damage to the adhesion when moisture is present in the solvent. The proportion of solid component in the solution is suitably 10–50% (i.e., the solvent and plasticizer comprise about 90–50% of the solution).

The composition according to this invention can be colored with any coloring matter such as inorganic or organic pigment or dye. The amount of said coloring matter should be selected suitably depending upon the kind of coloring matter and the use.

The composition according to this invention can be coated on a substrate by any conventional coating technique which has been employed hitherto generally. Namely, a method such as brushing, dipping, spraying, roll-coating or the like may be used. Prior to the coating, foreign material is removed by cleaning the surface to be coated similarly to when using a conventional coating composition. However, since it is unnecessary to remove the moisture from the surface to be coated by drying the moisture completely, the coating procedure can be simplified to a great extent; this is a great advantage of the coating composition according to this invention.

The coating composition according to this invention may be mixed with various kinds of reagents corresponding to the purpose of its use. For example, a fluoride such as tin or sodium fluoride is added for preventing decayed teeth when the coating composition is used for coating teeth, the effect of said fluoride lasts for a long period of time. If a perfume or deodorizing agent is added, it is available for removing the halitosis. It is also of significance for the medical treatment to add various kinds of reagents, sterilizers or disinfectants when said coating composition is used as a bandage material. It is effective to add preservatives and insecticides when said coating composition is used for coating woods.

This invention will be described more fully by the following examples, in which parts are shown by weight unless otherwise specified.

EXAMPLE 1

Wood coating: Parts
Vinyl resin solution (40% solution of copolymer of 70% vinyl chloride and 30% vinyl acetate in ethyl and butyl acetate) _____ 100
Dibutyl phthalate _____ 10
Methyl cyanoacrylate _____ 0.4
Tannic acid _____ 0.2
Pigment _____ 2

In the formulation as mentioned above, the vinyl resin solution, dibutyl phthalate, tannic acid and pigment are mixed first for 5–15 minutes in a mixer to form a homogeneous dispersion mixture, to which the cyanoacrylate is then added dropwise with rapid stirring to yield the desired composition.

The composition so-manufactured was coated on a wet piece of wood, dried for 3 minutes by a drier at about 50° C. and dipped in water at room temperature. The stripping of the coat film is not observed even after more than 20 days.

For the control composition to which cyanoacrylate was not added (otherwise having the same composition as in the example), the coat film begins to strip within 5 days.

EXAMPLE 2

Glass coating: Parts
Vinyl resin solution (40% solution of copolymer of 75% vinyl chloride and 25% vinyl acetate in ethyl and butyl acetate) _____ 20
Nitrocellulose (25% solution in acetone and butyl acetate, viscosity: ½ sec.) _____ 80
Benzyl butyl phthalate _____ 20
Ethyl cyanoacrylate _____ 0.3
Titanium oxide _____ 2

Similarly to Example 1, the cyanoacrylate is finally added dropwise to yield a homogeneous mixture, which is then coated on a glass piece by a brush to form a strong coat film.

EXAMPLE 3

Tooth coating: Parts
Vinyl resin solution (40% solution of copolymer of 60% vinyl chloride, 30% vinyl acetate and 10% methyl methacrylate in ethyl and butyl acetate and methylethylketone) __ 100
Benzyl butyl phthalate _____ 30
Ethyl cyanoacrylate _____ 0.4
Tannic acid _____ 0.2
Tin fluoride _____ 0.1

Similarly to Example 1, the cyanoacrylate is added finally to yield a homogeneous mixture, which is a transparent liquid. When the liquid is coated on a tooth by a brush, a glossy and transparent coat film is obtained.

The resulting coat film endured the conventional meal and the cleaning by a tooth brush and was not stripped after 10 days. While the coating on the chewing surface was broken and removed when an especially hard thing was chewed, the coat film on other parts showed no damage. For the control having the same composition as this example except for adding no cyanoacrylate, the coat film over the whole surface was stripped in a day.

While a coloring matter may be added previously to the composition for coloring the composition in this example, the following composition may be prepared especially and used as an overcoat after undercoating with the composition of this example resulting in better results in the ahesion of coating and the shade and durability of coat film.

Parts
Nitrocellulose (viscosity: ½ sec., 25% solution in acetone and butyl acetate) _____ 100
Rosin ester resin _____ 20
Dioctyl phthalate _____ 2.5
Cyanoacrylate _____ 0.1
Pigment or natural fish scale _____ 1.0
Methanol _____ 0.1

Toxicity test of the composition according to this invention

The toxicity test of said compositon is caried out by the animal test considering the application to living bodies. 100 rats were used, which were divided into two groups. One group was coated with the composition according to this invention on their shins and the other group ate the composition in admixture with fodder.

The rats were coated two times a week at every given period for the test to skin and ate a given amount of coated powder for the administration of fodder. After continuing for a month, rats were killed and their skins and organs were pathologically examined.

As a result, there was observed no change in the local reaction by the skin coating test and in the organ reaction by the oral administration test.

It will be obvious to those skilled in the art that various changes may be made without departing from the spirit of the invention and therefore the invention is not limited to what is described in the specification, but only as indicated in the appended claims.

What is claimed is:

1. A coating composition consisting essentially of a vinyl resin, a solvent and a cyanoacrylate monomer represented by the general formula

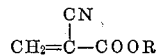

wherein R represents a hydrogen atom, or a saturated straight or branched aliphatic hydrocarbon radicals having 1–8 carbon atoms, said monomer being present in an amount of about 0.01–2% and the solid components of said composition comprising about 10–50% thereof.

2. A coating composition according to claim 1 characterized in that said cyanoacrylate is selected from the group consisting of cyanoacrylic acid and cyanoacrylic acid esters.

3. A coating composition according to claim 1 characterized in that said cyanoacrylate is contained in an amount of 0.2–1% by weight based on the total weight of said composition.

4. A method of rendering a vinyl resin coating composition adhesive to a wet surface which comprises adding to said composition 0.01–2% by weight of said composition of a cyanoacrylate represented by the general formula as indicated in claim 1.

5. A coating composition according to claim 1 wherein said vinyl resin comprises a copolymer of vinyl chloride and vinyl acetate and said composition further includes a plasticizer.

6. A coating composition according to claim 1 characterized in that said composition further contains 5–50% by weight based on said cyanoacrylate monomer of a compound selected from the group consisting of phosphoric acid, a Lewis acid, an organic carboxylic acid, an organic sulfonic acid, an aldehyde or a ketone.

7. A coating composition according to claim 1 useful in coating human teeth comprising

| | Parts |
|---|---|
| Vinyl resin solution 40% resin 60% solvent | 100 |
| Phthalate plasticizer | 30 |
| Cyanoacrylate according to claim 1 | 0.4 |
| Tannic acid | 0.2 |
| Tin fluoride | 0.1 |

8. A method of coating human teeth which comprises applying a coating composition according to claim 1 as a coating to the teeth, said coating composition comprising

| | Parts |
|---|---|
| Vinyl resin solution | 100 |
| Phthalate plasticizer | 30 |
| Cyanoacrylate according to claim 1 | 0.4 |
| Tannic acid | 0.2 |
| Tin fluoride | 0.1 |

9. A method of coating human teeth according to claim 8 which further comprises applying an overcoat of a composition comprising

| | Parts |
|---|---|
| Nitrocellulose solution | 100 |
| Rosin ester resin | 20 |
| Phthalate plasticizer | 2.5 |
| Cyanoacrylate according to claim 1 | 0.1 |
| Pigment | 1.0 |
| Menthol | 0.1 |

References Cited

UNITED STATES PATENTS

| 2,934,509 | 4/1960 | Crissey et al. | 260—30.6 |
| 3,112,290 | 11/1963 | Salyer | 260—45.5 |
| 3,234,169 | 2/1966 | Taub | 260—31.8 |
| 3,418,292 | 12/1968 | Muskat | 260—78.5 |

MORRIS LIEBMAN, Primary Examiner

R. ZAITLEN, Assistant Examiner

U.S. Cl. X.R.

117—73, 161; 260—17, 30.6, 881

UNITED STATES PATENT OFFICE
CERTIFICATE OF CORRECTION

Patent No. 3,507,822                    Dated April 21, 1970

Inventor(s) Torao MIYAMA

It is certified that error appears in the above-identified patent and that said Letters Patent are hereby corrected as shown below:

Please correct the inventor's name in the Letters Patent from "Torao Miyami" to
 --Torao MIYAMA-- as indicated in the specification.

Column 4, line 69 change "Methanol" to -- Menthol --

SIGNED AND
SEALED
SEP 1 - 1970

(SEAL)
Attest:

Edward M. Fletcher, Jr.
Attesting Officer

WILLIAM E. SCHUYLER, JR.
Commissioner of Patents